United States Patent
Konishi et al.

(10) Patent No.: US 12,474,471 B2
(45) Date of Patent: Nov. 18, 2025

(54) LIGHT DETECTION SENSOR, LIGHT DETECTION DEVICE, AND PAPER SHEETS PROCESSING DEVICE

(71) Applicant: Glory Ltd., Himeji (JP)

(72) Inventors: Hiroshi Konishi, Hyogo (JP); Takeshi Sato, Hyogo (JP); Yuuichirou Okui, Hyogo (JP)

(73) Assignee: GLORY LTD., Himeji (JP)

( * ) Notice: Subject to any disclaimer, the term of this patent is extended or adjusted under 35 U.S.C. 154(b) by 1014 days.

(21) Appl. No.: 17/043,080

(22) PCT Filed: Mar. 7, 2019

(86) PCT No.: PCT/JP2019/009175
§ 371 (c)(1),
(2) Date: Sep. 29, 2020

(87) PCT Pub. No.: WO2019/188096
PCT Pub. Date: Oct. 3, 2019

(65) Prior Publication Data
US 2021/0018622 A1    Jan. 21, 2021

(30) Foreign Application Priority Data
Mar. 30, 2018    (JP) ................................. 2018-068259

(51) Int. Cl.
*G01S 17/04* (2020.01)
*G01J 1/02* (2006.01)
(Continued)

(52) U.S. Cl.
CPC ............. *G01S 17/04* (2020.01); *G01J 1/0228* (2013.01); *G01J 1/4228* (2013.01); *G01S 7/4863* (2013.01)

(58) Field of Classification Search
CPC ........................... G01J 1/4228; H01L 31/1013
See application file for complete search history.

(56) References Cited

U.S. PATENT DOCUMENTS 5,479,032 A * 12/1995 Forrest ............... H10F 39/1843
                                                   257/190
10,317,200 B1 * 6/2019 Han ...................... G01B 11/26
(Continued)

FOREIGN PATENT DOCUMENTS

DE    102016113131 A1 * 1/2018
EP    2 790 159 A1    10/2014
(Continued)

OTHER PUBLICATIONS

"InGaAs Amplified Photodetector with Thermoelectric Cooler" accessed from "www.thorlabs.com/newgrouppage9.cfm?objectgroup_ID=5713" with WayBack Machine date of Jun. 21, 2016. (Year: 2016).*

(Continued)

*Primary Examiner* — Yashita Sharma
*Assistant Examiner* — Zhengqing Qi
(74) *Attorney, Agent, or Firm* — XSENSUS LLP (57) ABSTRACT

A light detection sensor 10 comprises a light source 12 for radiating light to a detection object T and a light receiver 11 comprising a plurality of detectors for detecting intensity of light from the detection object T. The plurality of detectors comprises at least, a first detector 11a for detecting intensity of light of a first wavelength band, and a second detector 11b for detecting intensity of light of a second wavelength band different from the first wavelength band. Sensitivity of the first detector 11a to the light of the first wavelength band is lower than sensitivity of the second detector 11b to the light of the second wavelength band. A light receiving area of the first detector 11a is larger than a light receiving area of the second detector 11b.

7 Claims, 10 Drawing Sheets

(51) Int. Cl.
*G01J 1/42* (2006.01)
*G01S 7/4863* (2020.01)

(56) References Cited

U.S. PATENT DOCUMENTS

| | | | | |
|---|---|---|---|---|
| 2014/0001345 | A1* | 1/2014 | Tsuzuki | G01J 1/44 250/214 LA |
| 2014/0305846 | A1* | 10/2014 | Miura | B07C 5/02 209/3.1 |
| 2016/0027838 | A1* | 1/2016 | Park | H01L 27/14665 257/440 |
| 2016/0098879 | A1 | 4/2016 | Fukunaga | |
| 2016/0225215 | A1* | 8/2016 | Yamaguchi | G07D 7/005 |
| 2016/0254300 | A1* | 9/2016 | Wajs | H01L 27/14649 257/435 |
| 2017/0309769 | A1* | 10/2017 | Engel | H01L 31/0232 |

FOREIGN PATENT DOCUMENTS

| | | | |
|---|---|---|---|
| JP | 09-211147 | A | 8/1997 |
| JP | 2003-130727 | A | 5/2003 |
| JP | 2006352466 | A * | 12/2006 |
| JP | 2009-182189 | A | 8/2009 |
| JP | 2011-170695 | A | 9/2011 |
| JP | 2016-009445 | A | 1/2016 |
| JP | 2016-053881 | A | 4/2016 |
| JP | 6063844 | B2 | 1/2017 |

OTHER PUBLICATIONS

Machine Translation of JP-2006352466-A (Year: 2006).*
Machine Translation of DE102016113131A1 (Year: 2018).*
ThorlabsGePD (accessed from "www.thorlabs.com/newgrouppage9.cfm?objectgroup_id=947" with WayBack Machine date of Sep. 19, 2015). (Year: 2015).*
Datskos, Panos G., and Nickolay V. Lavrik. "Detectors—Figures of Merit." Encyclopedia of Optical Engineering, Second Edition. pp. 451-459. (2016). (Year: 2016).*
Riedl, M. "Signal-to-Noise Ratio." Optical Design Fundamentals for Infrared Systems, Second Edition, SPIE Press, Bellingham, WA (2001). (Year: 2001).*
Inverse Square Law (accessed from "hyperphysics.phy-astr.gsu.edu/hbase/Forces/isq.html" with Wayback Machine dated Feb. 9, 2018). (Year: 2018).*
Lewis Larmore, "Range Equation for Passive-Infrared Devices," in Proceedings of the IRE, vol. 47, No. 9, pp. 1489-1490, Sep. 1959. (Year: 1959).*
International Search Report and Written Opinion mailed on Jun. 4, 2019 for PCT/JP2019/009175 filed on Mar. 7, 2019, 10 pages including English Translation of the International Search Report.
Extended European Search Report issued Jan. 13, 2021 in European Patent Application No. 19776708.0, 12 pages.

\* cited by examiner

| DISTRIBUTION OF EMISSION INTENSITY | SENSITIVITY OF FIRST DETECTOR | | |
|---|---|---|---|
| | DISPOSITION | AREA | DISPOSITION + AREA |
| WITH PEAK | GOOD | GOOD | EXCELLENT |
| WITHOUT PEAK | FAIR | GOOD | GOOD |

LIGHT DETECTION SENSOR, LIGHT DETECTION DEVICE, AND PAPER SHEETS PROCESSING DEVICE

CROSS-REFERENCE TO RELATED APPLICATIONS

The present application is based on PCT filing PCT/JP2019/009175, filed Mar. 7, 2019, which claims priority to JP 2018-068259, filed Mar. 30, 2018, the entire contents of each are incorporated herein by reference.

TECHNICAL FIELD

The present invention relates to a light detection sensor, a light detection device, and a sheet processing apparatus.

BACKGROUND ART

Conventionally, as a feature indicating the authenticity of a valuable sheet medium such as a bill (banknote) or a valuable security, a portion with a characteristic of phosphorescence is provided on the sheet medium. In a sheet processing apparatus and the like, this portion is detected by using a light detection sensor, and authenticity of the sheet medium is discriminated based on a detection signal detected by the light detection sensor.

PTL 1 describes a sensor device for obtaining color information of the medium based on the light detection signal from each light receiving element in a line sensor with a plurality of the light receiving elements for receiving light in different wavelength bands respectively.

PTL 2 describes a sensor device with a plurality of pixels for receiving light of different wavelength bands respectively, and the sensor device performs gain adjustment of outputs of the each pixel so that detection intensity of each pixel is the same, in the case where the sensitivity of each pixel is different.

CITATION LIST

Patent Literature

PTL 1
  Japanese Patent Application Laid-Open No. 2016-9445
PTL 2
  Japanese Patent No. 6063844

SUMMARY OF INVENTION

Technical Problem

Generally, since the sensitivity of each light receiving element of the sensor device differs depending on the wavelength of the light to be detected, in the invention described in PTL 1, in the case where each light receiving element detects light of different wavelengths and same intensity, magnitude of the output signal outputted from each light receiving element is different for each light receiving element.

Therefore, for example, in the case of detecting the light in a certain wavelength band with low emission intensity by the light receiving element of which sensitivity relative to the light of the wavelength band is low, it is difficult to accurately detect the light of the wavelength band because the output signal that the light receiving element outputs becomes faint. Since the light with low emission intensity is susceptible to noise because of the less amount of light received by the light receiving element, it is more difficult to accurately detect the intensity of the light.

In the invention described in PTL 2, in the case where the magnitude of the output value outputted from each pixel is different, the magnitude of the output value is corrected by the gain adjustment. However, in the case of increasing the gain of the output of the pixel with low sensitivity, noise is also amplified. Therefore, in this method, the output from each pixel is susceptible to noise, it is difficult to accurately detect the intensity of light with wavelength band of which emission intensity is low.

It is an object of the present disclosure to provide a light detection sensor, a light detection device, and a sheet processing apparatus capable of correcting the magnitude of the output of a light receiver comprising a detector having different sensitivity for each wavelength of the light to be detected, and performing the detection of the intensity of light while suppressing the influence of noise.

Solution to Problem

To achieve the above object, a light detection sensor of the present invention is the light detection sensor comprising: a light source for radiating light to a detection object; and a light receiver comprising a plurality of detectors for detecting the intensity of light from the detection object, wherein the plurality of detectors comprises at least, a first detector for detecting intensity of light of a first wavelength band, and a second detector for detecting intensity of light of a second wavelength band different from the first wavelength band, sensitivity of the first detector to the light of the first wavelength band is lower than sensitivity of the second detector to the light of the second wavelength band, and a light receiving area of the first detector is larger than a light receiving area of the second detector.

A light detection device of the present invention is the light detection device comprising: the light detection sensor described above, and a controller for controlling the light detection sensor, wherein the controller detects at least the intensity of the light of the first wavelength band and the intensity of the light of the second wavelength band during extinction of the light source after the light is radiated from the light source to the detection object.

A sheet processing apparatus of the present invention is the sheet processing apparatus comprising the light detection device described above, wherein sheet recognition processing is performed based on at least the intensity of the light of the first wavelength band and the intensity of the light of the second wavelength band detected during the extinction of the light.

Advantageous Effects of Invention

According to the light detection sensor, the light detection device, and the sheet processing apparatus of the present invention, it is possible to correct the magnitude of the output of a light receiver comprising a detector having different sensitivity for each wavelength of the light to be detected, and to perform the detection of the intensity of light while suppressing the influence of noise.

DESCRIPTION OF EMBODIMENTS

Hereinafter, embodiment of the present invention will be described with reference to the drawings. The same components are denoted by the same reference numerals. The drawings schematically illustrate respective components for easy understanding.

Configuration of Light Detection Device

Figure 1:
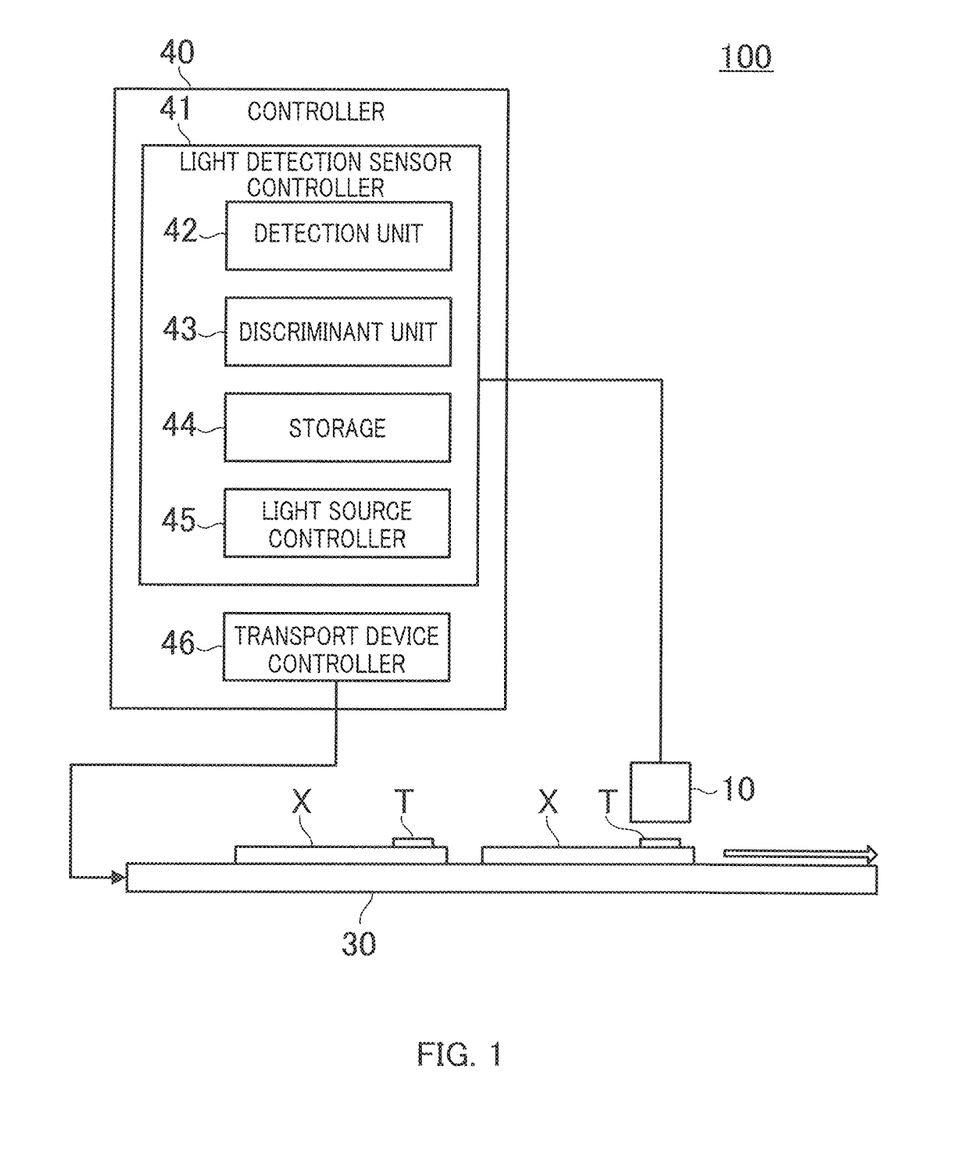
FIG. 1 is a diagram illustrating an example of each part of the function and configuration of a light detection device of the present invention.

FIG. 1 is a diagram illustrating an example of each part of the function and configuration of a light detection device 100 of the present invention. The light detection device 100 is a device used to discriminate the authenticity of the detection object T attached to the transported object X transported by the transport device 30.

For example, the transported object X is a sheet medium such as a bill (banknote) or a valuable security, and the detection object T is a security mark printed on the banknote or the like using an ink comprising a phosphorescent radiation material which radiates phosphorescence when electrons in the molecule are excited. The phosphorescent radiation material applied to the transported object X is predetermined according to the type of the transported object X. The light detection device 100 comprises a transport device 30, a light detection sensor 10, and a controller 40.

Here, phosphorescence refers to light radiated by a phosphor when the phosphor is irradiated with excitation light, or a phenomenon of radiating such light. The phosphorescence is light radiated by the phosphor during and after irradiation with excitation light, and in particular, light radiated by the phosphor after irradiation is referred to as afterglow.

The transport device 30 is a device for continuously transporting the transported object X to which the detection object T is attached at a predetermined position, in the direction indicated by the arrow. The transport device 30 is configured by a belt conveyer, a roller conveyer, a floating transport device, and/or the like in accordance with characteristics such as the shape of the transported object X.

In the present embodiment of the present invention, a case where the transport device 30 is configured by a belt conveyer will be described. The belt conveyer comprises a belt and a pulley for driving the belt. A rotary encoder that detects the number of rotations (rotation angle) of the pulley is connected to the rotation shaft of the pulley.

The transport device 30 comprises a passage detection sensor (not illustrated) for detecting passage of the transported object X, in the upstream side of the light detection sensor 10 in the transport direction of the transported object X.

The controller 40 is a control device for controlling the light detection sensor 10 and the transport device 30 and the like. The controller 40 is composed of an electric power source, a CPU, and a memory and the like, and comprises a light detection sensor controller 41, and a transport device controller 46.

The transport device controller 46 is a controller for controlling the operation of the transport device 30. The transport device controller 46 calculates information regarding the presence position of the detection object T such as a moving distance of the belt, that is, a moving distance of the detection object T, based on the number of pulses of the rotary encoder after the passage of the transported object X is detected by the passage detection sensor.

The light detection sensor controller 41 is a controller for controlling the light detection sensor 10, and comprises a detection unit 42, a discrimination unit 43, a storage 44, and a light source controller 45.

The detection unit 42 receives a light detection signal outputted from the light detection sensor 10. The detection unit 42 calculates the intensity of the radiation light radiated by the detection object T, based on the light detection signal.

The storage 44 stores information such as the intensity of each wavelength band of the radiation light radiated from the true detection object T, the decay time constant $\tau$ of the afterglow to be described later, as a reference value. These pieces of information serve as a basis for discriminating the authenticity of the detection object T.

The discrimination unit 43 compares the intensity of the radiated light obtained by the detection unit 42 with the intensity stored as the reference value in the storage 44 to discriminate the substance comprised in the detection object T and determine the authenticity of the detection object T. The discrimination unit 43 can also discriminate the authenticity of the detection object T by calculating the decay time constant τ of the afterglow and determining the substance included in the detection object T based on the decay time constant τ of phosphorescence.

The light source controller 45 is a controller for performing control of the lighting and extinction of the light source of the light detection sensor 10. The light source controller 45 performs the control of the lighting and extinction of the light source based on information regarding the presence position of the detection object T calculated by the transport device controller 46.

Configuration of Light Detection Sensor

Figure 2A:
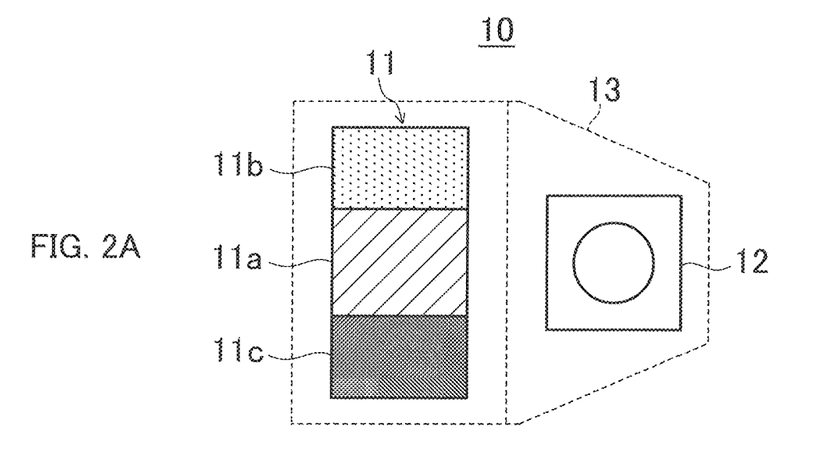
FIG. 2A is a bottom view illustrating an example of the configuration of the light detection sensor according to the embodiment 1.
Figure 2B:
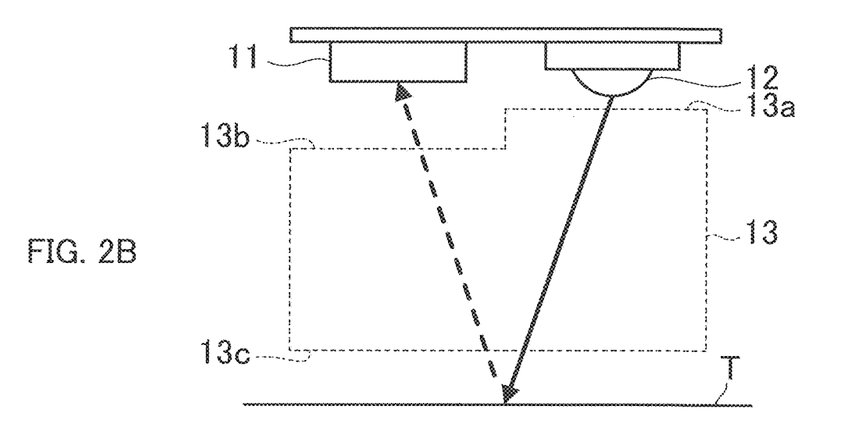
FIG. 2B is a front view illustrating an example of the configuration of the light detection sensor according to the embodiment 1.
Figure 2C:
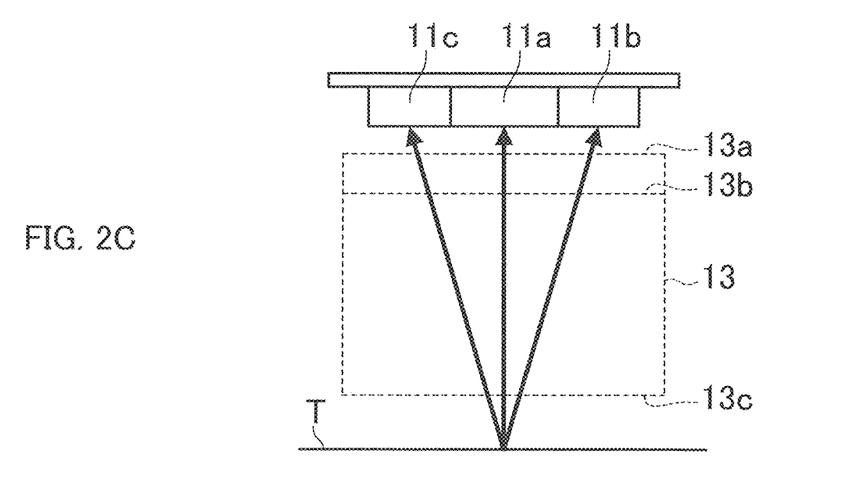
FIG. 2C is a left side view illustrating an example of the configuration of the light detection sensor according to the embodiment 1.

FIG. 2A is a bottom view illustrating an example of the configuration of the light detection sensor 10 according to the embodiment of the present invention, FIG. 2B is a front view illustrating an example of the configuration of the light detection sensor 10 according to the embodiment of the present invention, and FIG. 2C is a left side view illustrating an example of the configuration of the light detection sensor 10 according to the embodiment of the present invention.

The light detection sensor 10 is a sensor for detecting light from the detection object T attached to the transported object X. The light detection sensor 10 comprises a light receiver 11, a light source 12, a light guide body 13, a housing (not illustrated) and the like.

The housing is a box body for accommodating the light receiver 11, the light source 12, and the light guide body 13 inside. The housing is formed of, for example, a colored synthetic resin with shading characteristics. Note that the housing is not limited to such a synthetic resin, may be formed of a material with the shading characteristics, and, for example, may be formed of a metal such as aluminum.

The light source 12 is a projector for irradiating light relative to the detection object T. The light source 12 comprises, for example, a visible light source for irradiating visible light such as white light, an IR light source for irradiating infrared light, and a UV light source for irradiating ultraviolet light. The light source 12 can radiate light in these multiple wavelength bands simultaneously or individually.

Within these lights radiated by the light source 12, for example, the ultraviolet light is excitation light that excites the detection object T. The detection object T is excited by the light of the wavelength band inherent in the detection object T.

Hereinafter, an example will be described in which the light source 12 radiates the excitation light and the light receiver 11 detects the afterglow from the detection object T excited by the excitation light. However, the light receiver 11 may detect phosphorescence or fluorescence radiated from the detection object T during irradiation of the excitation light. The light receiver 11 may detect the reflected light reflected by the detection object T during irradiation with visible light such as white light.

The light guide body 13 is an optical element for guiding the excitation light radiated from the light source 12 to the detection region on the transport device 30 and guiding the light from the detection region to the light receiver 11. The light guide body 13 is a block body made of a transparent resin such as acrylic or polycarbonate.

The light guide body 13 comprises a light incident surface 13a at a position facing the light source 12, comprises a light radiation surface 13b at a position facing the light receiver 11, and comprises a light incident radiation surface 13c at a position facing the detection region on the transport device 30. The material of the light guide body 13 is not limited to a transparent material as long as it transmits the excitation light.

The light receiver 11 is a light detector for outputting an electric signal when receiving light from the detection object T. The light receiver 11 comprises a first detector 11a, a second detector 11b, and a third detector 11c. The first detector 11a, the second detector 11b, and the third detector 11c are, for example, Si photodiodes.

The material and structure of the first detector 11a, the second detector 11b, and the third detector 11c are not particularly limited. The number of detectors comprised in the light receiver 11 is not limited to three, and may be two, or four or more.

The light receiver 11 is formed in a rectangular shape, the first detector 11a, the second detector 11b, and the third detector 11c are disposed side by side along the long side of the light receiver 11 formed in the rectangular shape. However, as will be described later, there are various variations in the disposition of the first detector 11a, the second detector 11b, and the third detector 11c. The light detection sensor 10 is disposed in the light detection device 100, so that the long side of the light receiver 11 is perpendicular to the transport direction of the transported object X.

The light source 12 is disposed at a predetermined interval from the light receiver 11 in a direction in which the short side of the light receiver 11 extends. However, the disposition of the light receiver 11 and the light source 12 is not limited to this, for example, the light source 12 may be disposed with a predetermined interval from the light receiver 11 in a direction in which the long side of the light receiver 11.

Each of the first detector 11a, the second detector 11b, and the third detector 11c comprises a color filter for transmitting light of a predetermined wavelength band. The color filter is an optical filter for transmitting light in a band such as, for example, R (red), G (green), and, B (blue) which are the three primary colors of light, as well as UV (ultraviolet) and IR (infrared).

As illustrated in FIG. 2B, the excitation light from the light source 12 is incident on the light incident surface 13a of the light guide body 13. The excitation light incident on the light incident surface 13a propagates in the light guide body 13, and is radiated from the light incident radiation surface 13c.

The excitation light from the light incident radiation surface 13c is radiated to the detection object T existing in the detection region. The detection object T radiated with the excitation light is excited and radiates phosphorescence. The detection object T radiates the afterglow, after the irradiation of the excitation light is stopped.

The phosphorescence from the detection object T is incident onto the inside of the light guide body 13 from the light incident radiation surface 13c. The phosphorescence incident on the light guide body 13 propagates in the light guide body 13, and is radiated from the light radiation surface 13b.

The phosphorescence from the light radiation surface 13b is detected by the light receiver 11. As illustrated in FIG. 2C, the phosphorescence from the light radiation surface 13b propagated in the light guide body 13 reaches the light receiving surfaces of the first detector 11a, the second detector 11b, and the third detector 11c.

As described above, each of the first detector 11a, the second detector 11b, and the third detector 11c comprises the color filter that transmits light of different wavelength bands. The first detector 11a detects phosphorescence in the first wavelength band transmitted through the color filter, the second detector 11b detects phosphorescence in the second wavelength band transmitted through the color filter, and the third detector 11c detects phosphorescence in the third wavelength band transmitted through the color filter.

Method for Calculating Decay Characteristics of Afterglow

The detection object T as a phosphor contains a phosphorescent radiation material. The phosphorescent radiation material excites when excitation light is radiated, and radiates phosphorescence. The intensity of the phosphorescence radiated from the phosphorescent radiation material increases with the passage of time after the irradiation of the excitation light is started, and gradually decreases with the passage of time after the irradiation of the excitation light is stopped.

Each of the phosphorescent radiation materials in the detection object T comprises the inherent decay time constant $\tau$ of the afterglow (a time required for the phosphorescence intensity to become 1/e). That is, the decay curve of the afterglow drawn in the coordinate system with the horizontal axis indicating the elapsed time after the extinction of the light source 12, and the vertical axis indicating the intensity of the afterglow is different depending on each of the phosphorescent radiation materials.

In the present invention, after stopping the irradiation of the excitation light relative to the detection object T, by calculating the decay time constant $\tau$ of the afterglow that decreases with the passage of time, and comparing the calculated afterglow decay time constant $\tau$ with the decay time constant $\tau$ of the afterglow as a reference stored in the storage 44, the authenticity determination of the detection object T is performed. Hereinafter, a method of calculating the decay time constant $\tau$ of the afterglow.

First, the light source 12 radiates the excitation light. The radiated excitation light transmits through the light guide body 13. The excitation light transmitted through the light guide body 13 reaches the detection object T, and excites the detection object T. Thereafter, when the light source 12 is extinguished, the excited detection object T radiates the afterglow. The afterglow radiated from the detection object T is transmitted through the light guide body 13, and is detected by the light receiver 11.

The light receiver 11 detects the afterglow from the detection object T existing in the detection region at a first timing, and the afterglow from the detection object T existing in the detection region at a second timing after a predetermined time has elapsed from the first timing.

The light receiver 11 which detects the afterglow outputs a light detection signal corresponding to the intensity of the afterglow to the light detection sensor controller 41. The light detection sensor controller 41 which has received the light detection signal from the light receiver 11 performs the calculation of the intensity of the afterglow at the first timing and the second timing and the like. The decay time constant $\tau$ of the afterglow can be calculated based on the following equation 1.

[Equation 1]

$$\tau = -(t_2 - t_1)/\ln(P_2/P_1) \quad (1)$$

In the equation 1, $\tau$ is the decay time constant of the afterglow. Each of t1 and t2 is the elapsed time from extinction of the light source 12 to the detection of afterglow at the first timing and the second timing. Each of P1 and P2 is the intensity of the afterglow detected at the first timing and the second timing.

The discrimination unit 43 compares the calculated decay time constant $\tau$ of the afterglow with the reference value of the decay time constant $\tau$ of the afterglow of the detection object T stored in the storage 44, to discriminate the substance contained in the detection object T, and to determine the authenticity of the detection object T.

In the example described above, the decay time constant $\tau$ of the afterglow is calculated as the decay characteristic of the afterglow. However, the decay characteristic of the afterglow to be calculated is not limited to this. The decay characteristic of the afterglow may be calculated, for example, from a graph drawn by plotting the intensity of the afterglow detected by the light receiver 11. The intensity of the afterglow may be detected not only twice but also three or more times.

Further, the light receiver 11 may detect the afterglow from the detection object T during transporting, or may detect the afterglow from the detection object T when stopping the movement.

Figure 3:
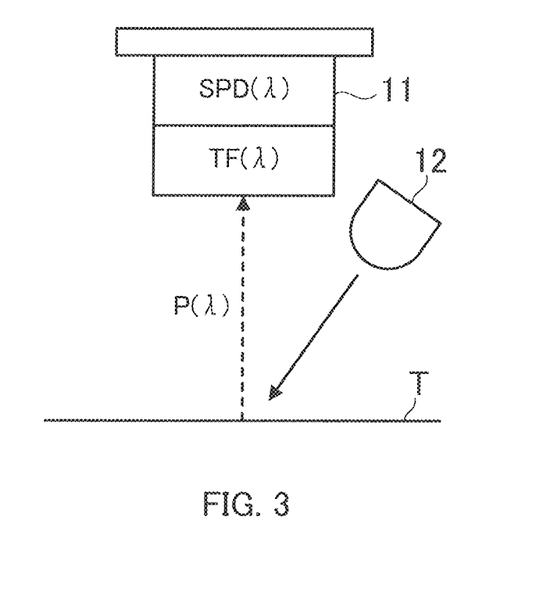
FIG. 3 is a diagram illustrating the relationship between the sensitivity of the light receiver and the magnitude of the light detection signal outputted by the light receiver.

Relationship Between Sensitivity of Light Receiver and Magnitude of Light Detection Signal Outputted by Light Receiver Next, the relationship between the magnitude of the light detection signal outputted by the light receiver 11 of the light detection sensor 10 and the sensitivity of the light receiver 11. FIG. 3 is a diagram illustrating the relationship between the sensitivity of the light receiver 11 and the magnitude of the light detection signal outputted by the light receiver 11.

In FIG. 3, P ($\lambda$) indicates the emission intensity of the light in the wavelength band with $\lambda$ as a representative value from the detection object T, TF ($\lambda$) indicates the transmittance of the color filter relative to the light in the wavelength band with $\lambda$ as the representative value, SPD ($\lambda$) indicates the sensitivity of the light receiving element of each detector relative to the light in the wavelength band with $\lambda$ as the representative value. The representative value includes, for example, the center wavelength of the spectrum of light.

Here, the magnitude $V(\lambda)$ (the value per unit area of the light receiving surface) of the light detection signal outputted by each detector of the light receiver 11 can be calculated based on the following equation 2.

[Equation 2]

$$V(\lambda) = P(\lambda) \times TF(\lambda) \times SPD(\lambda) \quad (2)$$

Since each detector comprises the light receiving element and the color filter, the sensitivity of each detector with the color filter can be calculated based on the product $\{TF(\lambda) \times SPD(\lambda)\}$.

In the present embodiment, in accordance with the sensitivity of each detector of the light receiver 11, by changing the light receiving area of the light receiving surface of each detector, the magnitude of the light detection signal outputted by each detector is adjusted, and the difference in the sensitivity in each detector is corrected.

In particular, in the case where the transmittance $TF(\lambda)$ of the filter of each detector is constant at all wavelengths, the size of the light receiving area is set in accordance with the sensitivity $SPD(\lambda)$ of the light receiving element of each detector. Specifically, the light receiving area of the light receiving surface in the light receiving element of which sensitivity $SPD(\lambda)$ is low is set larger than the light receiving area of the light receiving surface in the light receiving element of which sensitivity SPD (λ) is high.

In the case where the transmittance TF(λ) of the filter provided in each light receiving element is different for each wavelength band λ, the magnitude of the light receiving area of the light receiving surface is set in accordance with the sensitivity of each detector {TF(λ)×SPD(λ)}. Specifically, the light receiving area of the light receiving surface in the light receiving element of which sensitivity {TF(λ)×SPD (λ)} is low is set larger than the light receiving area of the light receiving surface in the light receiving element of which sensitivity {TF(λ)×SPD(λ)} is high. Thus, it is possible to suppress the variation in the magnitude of the light detection outputted the light detection signal outputted by each detector of the light receiver 11, and the difference in sensitivity of each detector is corrected.

In the case where the sensitivity SPD(λ) of the light receiving element is constant for all the wavelength bands λ, the size of the light receiving area of the light receiving surface of each light receiving element may be set in accordance with the transmittance TF(λ) of the color filter. In the case where the emission intensity P(λ) of the light radiated by the detection object T is different for each wavelength λ, the size of the light receiving area of the light receiving surface of each light receiving element may be set in accordance with the emission intensity P(λ).

Figure 4:
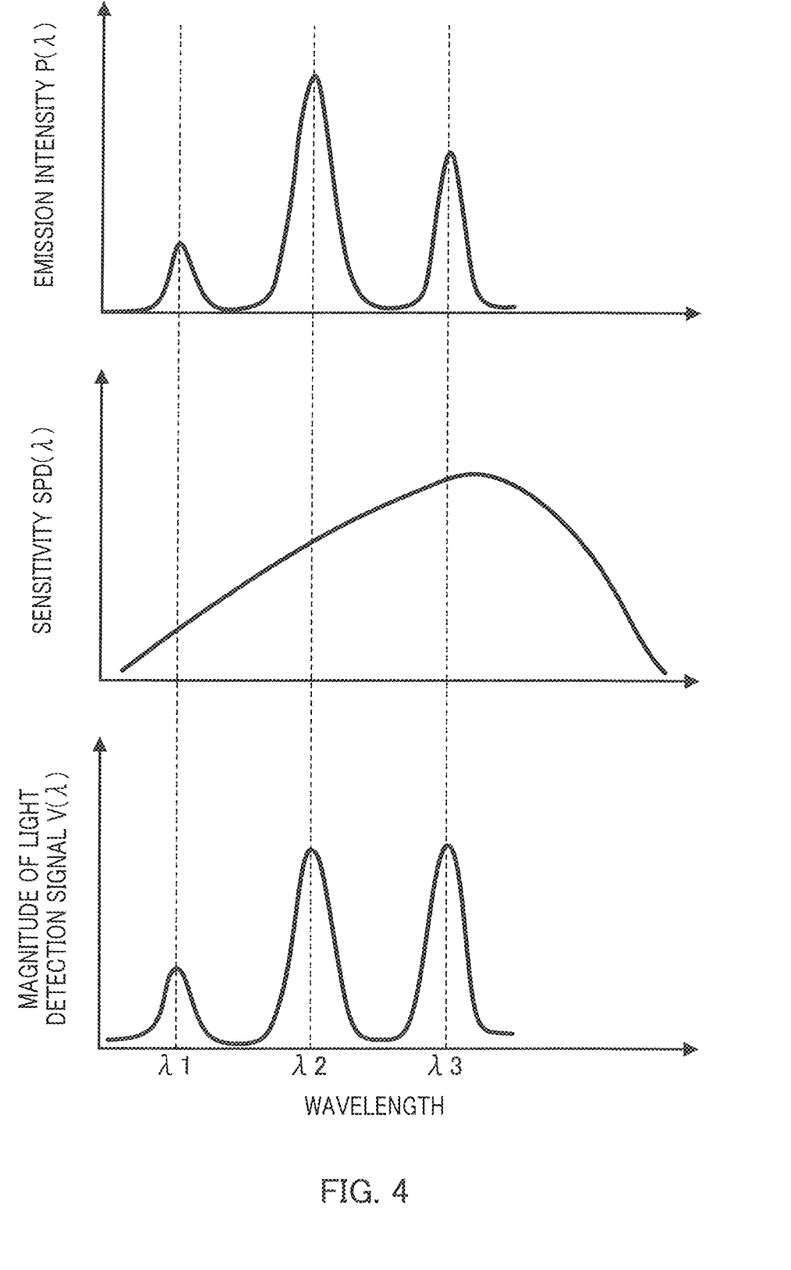
FIG. 4 is a diagram illustrating an example of the relationship between the emission intensity of the detection object, the sensitivity of the light receiving element, and the magnitude of the light detection signal.

Here, the relationship between the emission intensity P of light radiated from the detection object T(λ), the sensitivity SPD(λ) of the light receiving element, and the magnitude V(λ) of the light detection signal outputted from the detector will be described with reference to a graph. FIG. 4 is a diagram illustrating an example of the relationship between the emission intensity of the detection object T, the sensitivity of the light receiving element, and the magnitude of the light detection signal. In order to simplify the description here, the transmittance TF(λ) of the color filter is constant for all wavelengths λ.

FIG. 4 illustrates a case where the detection object T radiates light in the wavelength band represented by the representative value λ1, λ2 and λ3, and the sensitivity SPD(λ) of the light receiving element of each detector increase as the wavelength increases from λ1 to λ3.

In this case, since the transmittance TF(λ) of the color filter is constant, a peak appears in the wavelength λ1, λ2, λ3, in the graph of the magnitude V(λ) of the light detection signal. The magnitude V(λ) of the light detection signal for the light of the wavelength band represented by the representative value λ1 becomes smaller than the magnitude V(λ) of the light detection signal for the light of the representative value λ2 and λ3.

As a result, variations in the size of the light detection signal outputted from the light receiver 11 occurs. When the magnitude of the light detection signal is small, the influence of noise is increased, and it is difficult to accurately detect the emission intensity of the light in the wavelength band represented by the representative value λ1.

In the present invention, by setting the size of the light receiving area of the light receiving element in accordance with the wavelength band of the light to be received, it may be corrected for the difference of the sensitivity of each light receiving element. Specifically, as described above, the light receiving area of the light receiving surface is increased in the detector receiving the light of the wavelength of which sensitivity SPD(λ) of the light receiving element is low. As another method, by determining the disposition of the light receiving element in accordance with the wavelength band of the light to be received, it may be corrected for the difference in sensitivity of each light receiving element. Furthermore, by performing both of these, it may be corrected for the difference in sensitivity of each light receiving element. The determination of the disposition of the light receiving element will be described in detail later.

In the present embodiment, each detector of the light receiver 11, for example, as illustrated in FIG. 4, is formed by the light receiving element indicating the same sensitivity characteristics. However, each light receiving element may be formed of different materials, and may indicates the different sensitivity characteristics.

For example, in the light receiving element configuring the second detector 11b and the third detector 11c, a case where the sensitivity to light of the wavelength band representative value λ1 is low is considered. In this case, the first detector 11a may be configured by a light receiving element formed of a material with a higher sensitivity to light in the wavelength band λ1 than that of each of the light receiving elements of the second detector 11b and the third detector 11c. In this way, it is possible to suppress the variation in sensitivity between each detector of the light receiver 11.

Figure 5A:
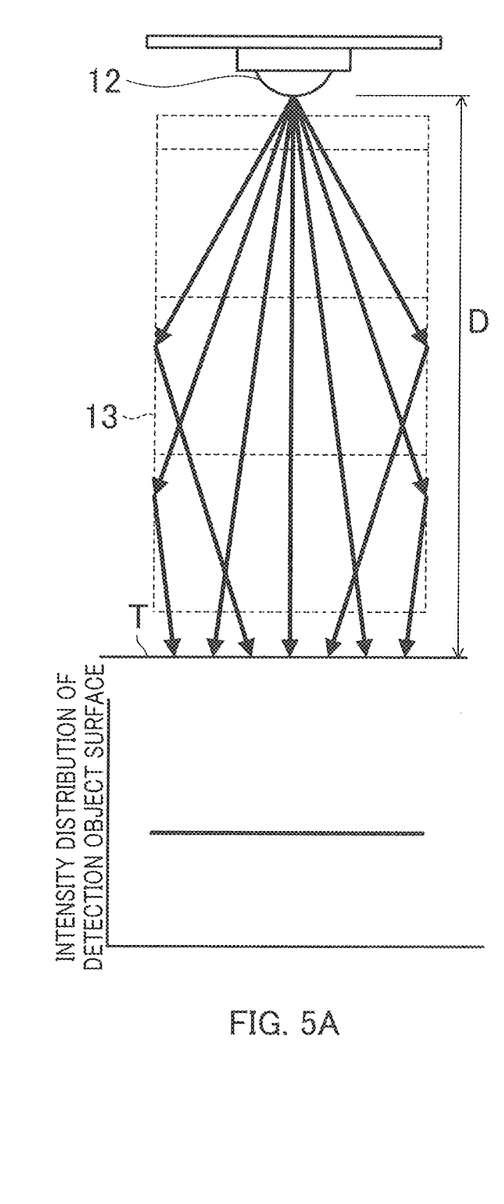
FIG. 5A is a diagram illustrating the distribution of intensities of lights radiated on the detection object.
Figure 5B:
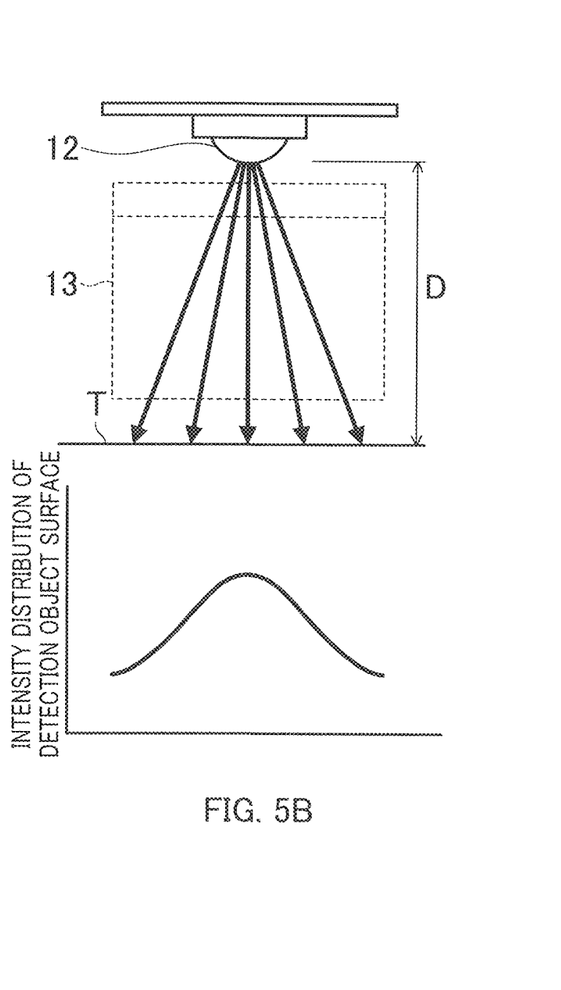
FIG. 5B is a diagram illustrating the distribution of intensities of lights radiated on the detection object.

Next, the relationship between the distance D between the light detection sensor 10 comprising the light source 12 and the detection object T, and the intensity distribution of the light radiated to the detection object will be described. FIG. 5A and FIG. 5B are diagrams illustrating the distributions of intensities of lights radiated on the detection object.

As illustrated in FIG. 5A, in the case where the light source 12 is disposed away from the detection object T, the light from the light source 12 repeats reflecting in the light guide body 13. The intensity distribution of the light radiated to the detection object T is likely to be uniform, and the intensity of the phosphorescence (afterglow) radiated from the detection object T is also likely to be uniform. As a result, the intensity distribution of the phosphorescence (afterglow) at the light receiving surface of the light receiver 11 is likely to be uniform.

In this case, by increasing the light receiving area of the light receiving surface in the detector with low sensitivity within the first detector 11a, the second detector 11b, and the third detector 11c, illustrated in FIG. 2, it is possible to correct the variation in sensitivity of the detector.

On the other hand, as illustrated in FIG. 5B, in the case where the light source 12 is disposed near the detection object T, the light directly reaches the detection object T, and the intensity distribution of the light is a distribution that the peak appears at a position near the light source 12. As a result, the peak also appears in the intensity of the phosphorescence (afterglow) radiated from the detection object T, further, the peak also appears in the intensity distribution of the phosphorescence (afterglow) detected by the light receiver 11.

In this case, the light receiving area of the detector with low sensitivity within the first detector 11a, the second detector 11b, and the third detector 11c may be increased, or the detector with low sensitivity may be disposed at a position where the peak of the light intensity distribution appears. Alternatively, both of them may be performed. Thus, it is possible to correct variations in sensitivity of each detector.

FIG. 6 to FIG. 11 illustrate examples of the configuration of the light receiver 11 of the light detection sensor 10 according to the present embodiment. In the example described below, it is assumed that the sensitivity of the first detector 11a is lower than the sensitivity of each of the second detector 11b and the third detector 11c.

Figure 6:
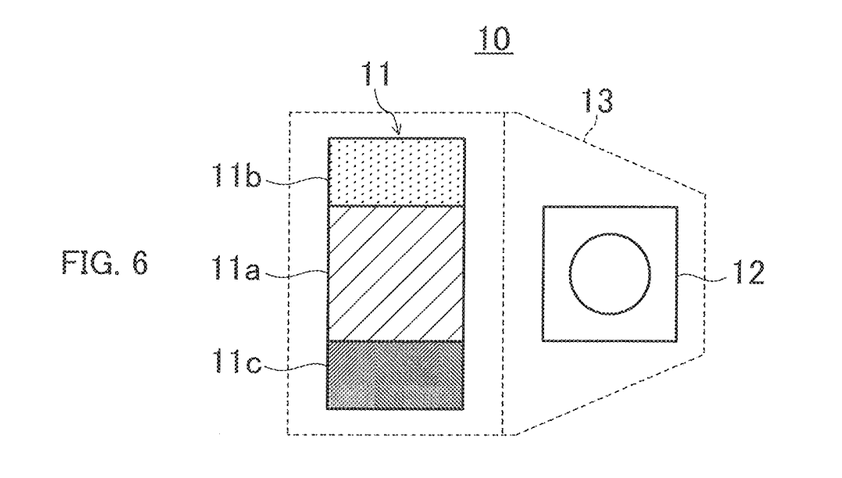
FIG. 6 is a diagram illustrating an example of a configuration of the light detection sensor according to the embodiment.

FIG. 6 is a diagram illustrating an example of a configuration of the light receiver 11 of the light detection sensor 10 according to the present embodiment. In the example illustrated in FIG. 6, the light receiving area of the first detector 11a is larger than the light receiving area of each of the second detector 11b and the third detector 11c. Thus, it is possible to correct variations in sensitivity of each detector.

To what extent the light receiving area of the first detector 11a is increased is determined in accordance with the sensitivity of the light receiving element of the second detector 11b and the third detector 11c, the transmittance of the color filter, the emission intensity of the light radiated by the detected target T and/or the like.

In this example, the light-receiving area of the second detector 11b and the light-receiving area of the third detector 11c are the same size. In the case where there is a difference in the sensitivity and/or the like between the second detector 11b and the third detector 11c, a difference may be provided between the light receiving area of the second detector 11b and the light receiving area of the third detector 11c.

Specifically, in the case where the sensitivity of the second detector 11b to the light in the wavelength band represented by the representative value $\lambda 2$ is lower than the sensitivity of the third detector 11c to the light in the wavelength band represented by the representative value $\lambda 3$, the light receiving area of the second detector 11b is increased larger than the light receiving area of the third detector 11c. As a result, variations in sensitivity for each detector can be corrected.

As described above, when disposing the light detection sensor 10 with the light source 12 at a position near the detection object T, the peak of the emission intensity in the detection object T appears at a position near the light source 12. Therefore, in the example illustrated in FIG. 6, the intensity of the light per unit area detected by the first detector 11a is greater than the intensity of the light per unit area detected by each of the second detector 11b and the third detector 11c. Thus, it is necessary to determine the magnitude of the light receiving area of the first detector 11a, in consideration of the distance between the light detection sensor 10 and the detection object T.

Figure 7:
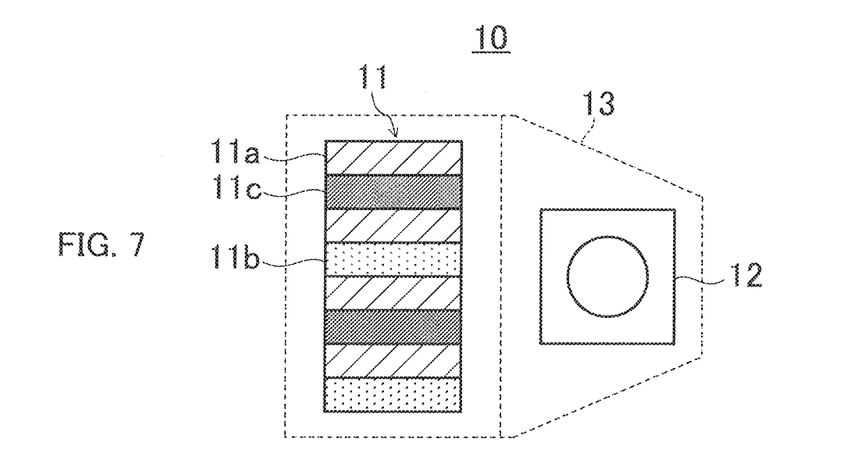
FIG. 7 is a diagram illustrating another example of the configuration of the light detection sensor according to the embodiment.

FIG. 7 is a diagram illustrating another example of the configuration of the light receiver 11 of the light detection sensor 10 according to the present embodiment. In the example illustrated in FIG. 7, each rectangular detector with the same light receiving area is arranged and disposed repeatedly in the order of the first detector 11a, the third detector 11c, and the second detector 11b, from one side of the long side of the light receiver 11 toward the other side. Therefore, the number of the first detectors 11a is larger than each of the number of the second detectors 11b and the number of the third detectors 11c.

By disposing each detector in such a way, it is possible to increase the light receiving area of the first detector 11 more than that of each of the second detector 11b and the third detector 11c, and to correct the variation in sensitivity of each detector.

By disposing each detector in such a way, even in the case where it is impossible to receive light uniformly over the entire light receiving surface of the light receiver 11 since there is the bias in the intensity distribution of the light received by the light receiver 11, it is possible to suppress the variation in sensitivity and to accurately detect the intensity of the light of each wavelength band.

By forming each detector in the same size, it is easy to manufacture the detector, and it is possible to reduce the manufacturing cost.

Note that the case where there is the bias in the intensity distribution of the light received by the light receiver 11 is a case where there is unevenness in the phosphorescent radiation material applied as the detection object T on the transported object X, or a case where the detection object T is a character. That is, the case where there is the bias in the intensity distribution of the light received by the light receiver 11 is a case where the phosphorescence irradiation material is not uniformly applied in the irradiation range of the light radiated to the detection object T.

Figure 8:
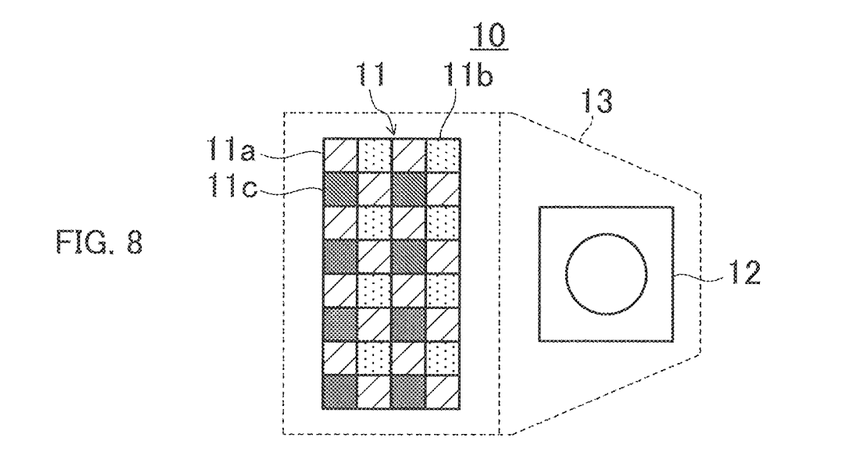
FIG. 8 is a diagram illustrating further another example of the configuration of the light detection sensor according to the embodiment.

FIG. 8 is a diagram illustrating further another example of the configuration of the light receiver 11 of the light detection sensor 10 according to the present embodiment.

In the example illustrated in FIG. 8, in the first column, the first detectors 11a and the third detectors 11c formed in a square shape are disposed repeatedly in this order, from one side of the long side of the light receiver 11 toward the other side.

In the second column adjacent to the light source 12 side of the detector of the first column, the second detectors 11b and the first detectors 11a are disposed repeatedly in this order, from one side of the long side of the light receiver 11 toward the other side.

In the third column and the fourth column, the detectors are disposed in the same order as in the first column and the second column, respectively.

By disposing each detector in such a way, it is possible to increase the light receiving area of the first detector 11a more than the light receiving area of each of the second detector 11b and the third detector 11c, and to correct the variation in sensitivity of each detector.

Even in the case where it is impossible to receive light uniformly over the entire light receiving surface of the light receiver 11 since there is the bias in the intensity distribution of the light received by the light receiver 11 it is possible to suppress the variation in sensitivity and to accurately detect the intensity of the light of each wavelength band.

By forming each detector in the same size, it is easy to manufacture the detector, and it is possible to reduce the manufacturing cost.

Figure 9:
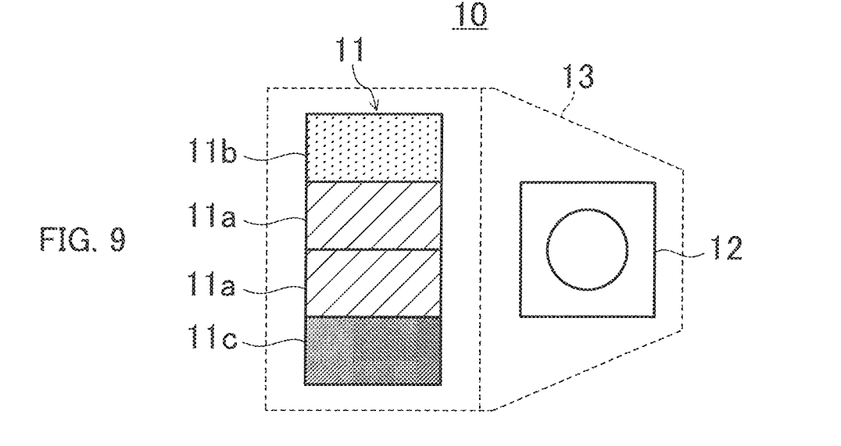
FIG. 9 is a diagram illustrating further another example of the configuration of the light detection sensor according to the embodiment.

FIG. 9 is a diagram illustrating further another example of the configuration of the light receiver 11 of the light detection sensor 10 according to the present embodiment. In the example illustrated in FIG. 9, the second detector 11b, the first detector 11a, the first detector 11a, and the third detector 11c are arranged and disposed in this order, from one side in a direction in which the long side of the light receiver 11 extends toward the other side. Here, the light receiving areas of the detectors have the same size.

By disposing each detector in such a way, it is possible to increase the light receiving area of the first detector 11a more than the light receiving area of each of the second detector 11b and the third detector 11c, and to correct the variation in sensitivity of each detector. By forming each detector in the same size, it is easy to manufacture the detector, and it is possible to reduce the manufacturing cost.

Figure 10:
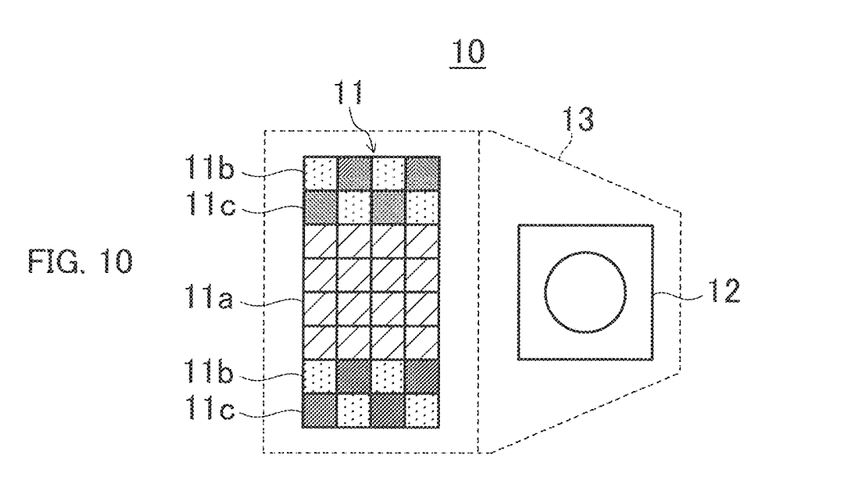
FIG. 10 is a diagram illustrating further another example of the configuration of the light detection sensor according to the embodiment.

FIG. 10 is a diagram illustrating further another example of the configuration of the light receiver 11 of the light detection sensor 10 according to the present embodiment. In the example illustrated in FIG. 10, the first detectors 11a of the square shape are disposed in the vicinity of the center in a direction in which the long side of the light receiver 11 extends, and the second detectors 11b and the third detectors 11c of the square shape are disposed alternately at both ends of the first detectors.

By disposing each detector in such a way, it is possible to increase the light receiving area of the first detector 11a more than the light receiving area of each of the second detector 11b and the third detector 11c, and to correct the variation in sensitivity of each detector. By forming each detector in the same size, it is easy to manufacture the detector, and it is possible to reduce the manufacturing cost.

Figure 11:
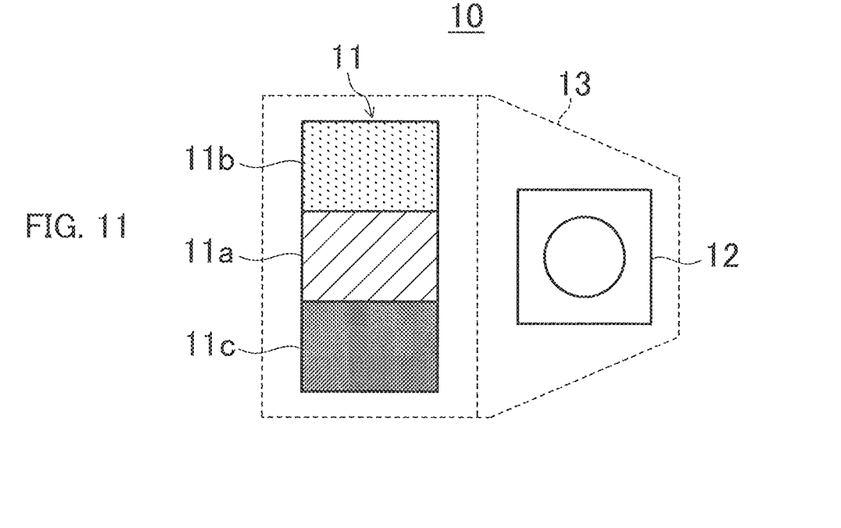
FIG. 11 is a diagram illustrating further another example of the configuration of the light detection sensor according to the embodiment.

FIG. 11 is a diagram illustrating further another example of the configuration of the light receiver 11 of the light detection sensor 10 according to the present embodiment. In the example illustrated in FIG. 11, the light detection sensor 10 comprising the light source 12 is disposed near the detection object T. The light receiving area of the first detector 11a, the light receiving area of the second detector 11b, and the light receiving area of the third detector 11c are formed in the same size, and the first detector 11a is disposed at a position near the light source 12.

As described above, in the case where the light detection sensor 10 is disposed near the detection object T, the peak appears in the intensity distribution of the phosphorescence (afterglow) at the light receiving surface of the light receiver 11. In this case, a detector with low sensitivity within the first detector 11a, the second detector 11b, and the third detector 11c, is disposed at the position where the peak appears.

By disposing each detector in such a way, it is possible to shorten the transmission path of the phosphorescence (afterglow) from the light source 12 to the first detector 11a, and to correct the variation in sensitivity of each detector.

Figure 12:
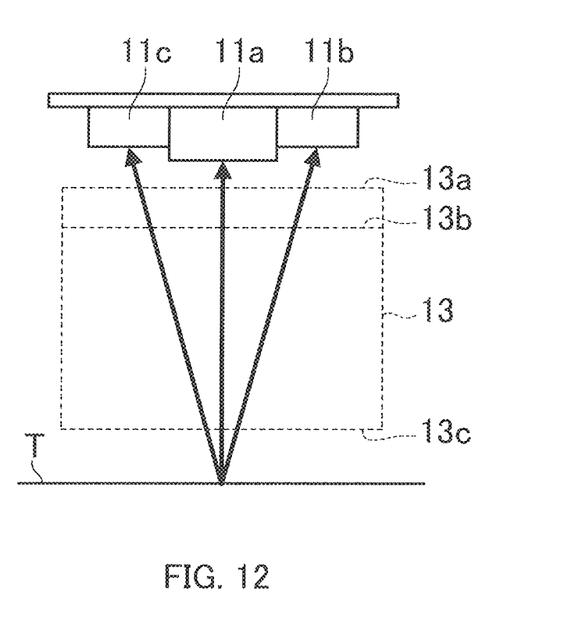
FIG. 12 is a diagram illustrating further another example of the configuration of the light detection sensor according to the embodiment.

FIG. 12 is a diagram illustrating further another example of the configuration of the light receiver 11 of the light detection sensor 10 according to the present embodiment. In the example illustrated in FIG. 12, the length of the path in which the phosphorescence (afterglow) reaches the first detector 11a from the detection object T is made shorter than the length of the path in which the phosphorescence (afterglow) reaches the second detector 11b or the third detector 11c from the detection object T.

By disposing each detector in such a way, it is possible to shorten the transmission path of the phosphorescence (afterglow) from the light source 12 to the first detector 11a, and the intensity of the light detected by the first detector 11a can be made larger than that of each of the second detector 11b and the third detector 11c. Thus, it is possible to correct variations in sensitivity of each detector.

Figure 13:
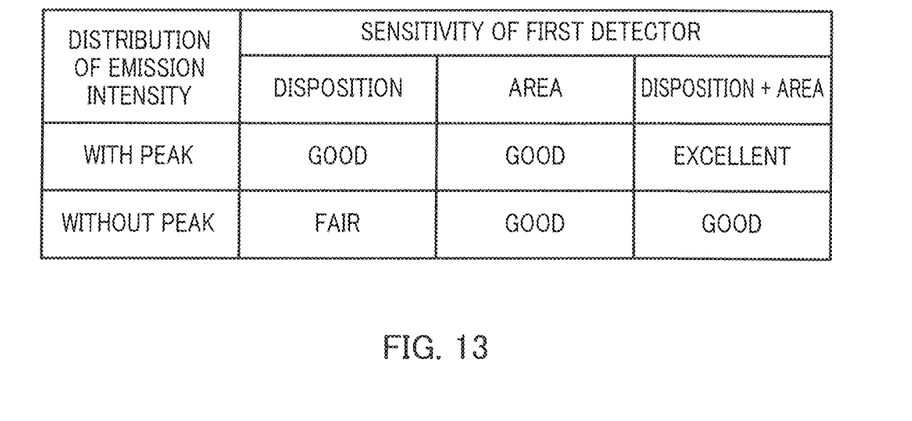
FIG. 13 is a diagram for explaining an effect achieved by the light detection sensor according to the embodiment.

FIG. 13 is a diagram for explaining an effect achieved by the light detection device 100 according to the present embodiment described above. In the case that the light detection sensor 10 is disposed near the detection object T and the peak appears in the intensity distribution of the light radiated to the detection object T, it is possible to correct the variation in sensitivity of each detector, by disposing the first detector 11a with low sensitivity near the position of the detection object T where the peak appears in the intensity distribution of the light.

By increasing the light receiving area of the first detector 11a with low sensitivity, it is also possible to correct the variation in sensitivity of each detector. By adjusting both the disposition and the light receiving area of the first detector 11a with low sensitivity, it is possible to correct the variation in sensitivity of each detector more easily.

It is considered about a case where the light source 12 is disposed away from the detection object T, and the peak does not appear in the intensity distribution of the light radiated to the detection object T, as illustrated in FIG. 5A. In this case, even by adjusting the disposition of the detectors with low sensitivity, the magnitude of the light detection signal outputted from each detector does not change so much, and it may not be possible to effectively correct the variation in sensitivity of each detector.

In this case, by increasing the light receiving area of the first detector with low sensitivity 11a, it is possible to increase the magnitude of the light detection signal outputted from the first detector 11a and to correct the variation in sensitivity of each detector.

As described above, in the case where the peak does not appear in the intensity distribution of the light radiated to the detection object T, even by adjusting the disposition of the first detector 11a with low sensitivity, the magnitude of the light detection signal outputted from each detector does not change so much. Therefore, when adjusting both the disposition and the light receiving area of the first detector 11a with low sensitivity, the same effect as the case of adjusting the size of the light receiving area can be achieved.

The light detection device 100 of the present embodiment may comprise a line sensor as a sensor for detecting the light from the detection object T attached to the transported object X. This line sensor will be described below with reference to FIG. 14 and FIG. 15.

Figure 14:
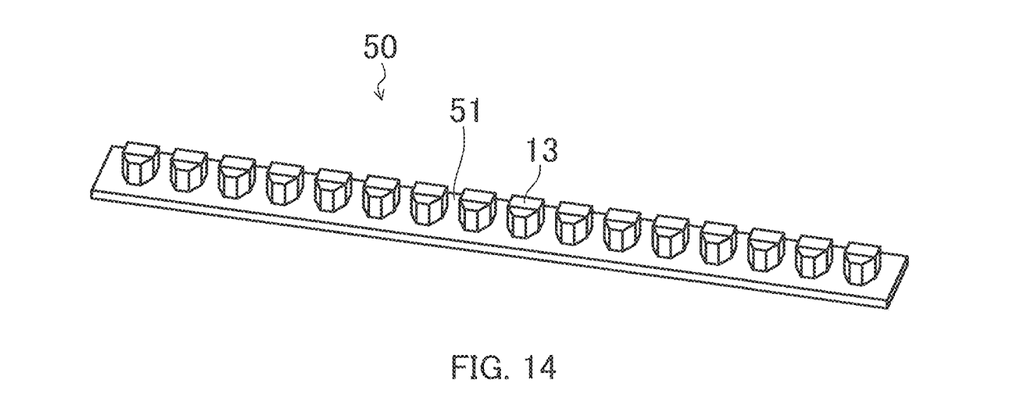
FIG. 14 is a perspective view illustrating a light guide component according to the embodiment.
Figure 15:
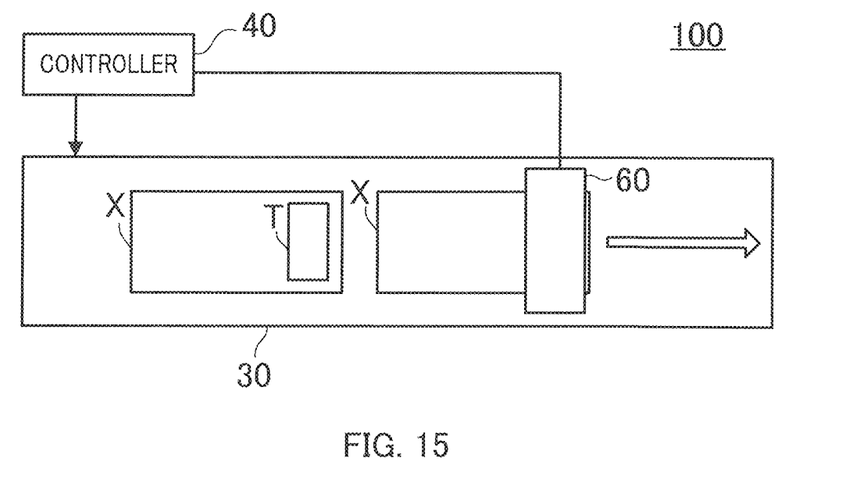
FIG. 15 is a top view of the light detection device of the present invention comprising a line sensor with the light guide component illustrated in FIG. 14.

FIG. 14 is a perspective view illustrating a light guide component 50 according to the embodiment. FIG. 15 is a top view of the light detection device 100 of the present invention comprising a line sensor 60 with the light guide component 50 illustrated in FIG. 14. The light guide component 50 comprises a plurality of the light guide bodies 13 and a cover glass 51, and a plurality of the light guide bodies 13 is disposed by arranged in a line on one surface of the cover glass 51. The line sensor 60 is formed by disposing the light receiver 11 and the light source 12 illustrated in FIG. 2A to FIG. 2C, on the upper side of each of the light guide body 13 of the light guide component 50. The line sensor 60 is installed in the light detection device 100 so that the long side of the line sensor 60 is perpendicular to the transport direction (arrow in FIG. 15) of the transported object X.

By comprising the line sensor 60, even if various types of transported objects X of which positions where the detection object T is attached are different are transported by the transport device 30, the light detection device 100 can reliably determine the authenticity of the detection object T of those transported object X. For example, it is assumed as the transported object X, a transported object A to which the detection object T is attached in the one side region in a direction perpendicular to the transport direction of the transported object, the transported object B to which the detection object T is attached in the central region, and the transported object C to which the detection object T is attached in the other side region. Even when any of the transported object A, the transported object B, and the transported object C is transported by the transport device 30, the light detection device 100 comprising the line sensor 60 can determine the authenticity of detection object T attached to each transported object.

The light detection device 100 of the present embodiment can be provided in, for example, a sheet processing apparatus. In this case, the sheet processing apparatus can recognize the authenticity of the sheet by determining the authenticity of the detection object T attached to the sheet such as the banknote to be processed and the valuable security.

As described above, the present invention adjusts at least any of the light receiving area or the disposition of the detector with low sensitivity within the detectors of the light receiver 11. Thus, it is possible to correct the magnitude of the output of the detector having different sensitivity for each wavelength of the light to be detected, to suppress the influence of noise, and to detect the intensity of the light.

This application is entitled to and claims the benefit of Japanese Patent Application No. 2018-068259 filed on Mar. 30, 2018, the disclosure of which including the specification, drawings and abstract is incorporated herein by reference in its entirety.

INDUSTRIAL APPLICABILITY

The present invention is widely applicable to a light detection sensor, a light detection device, a sheet processing apparatus, and a light detection method.

REFERENCE SIGNS LIST

10 Light detection sensor
11 Light receiver
11a First detector
11b Second detector
11c Third detector
12 Light source
13 Light guide body
13a Light incident surface
13b Light radiation surface
13c Light incident radiation surface
30 Transport device
40 Controller
41 Light detection sensor controller
42 Detection unit
43 Discriminant unit
44 Storage
45 Light source controller
46 Transport device controller
50 Light guide component
51 Cover glass
60 Line sensor
100 Light detection device
X Transported object
T Detection object

The invention claimed is:

1. A light detection sensor for use in a sheet processing apparatus that performs a sheet recognition processing, the light detection sensor comprising:
a light source configured to radiate light to a detection object attached to a sheet; and
a light receiver comprising a plurality of detectors configured to detect intensity of light from the detection object, wherein
the plurality of detectors comprises a first detector configured to detect intensity of light of a first wavelength band, and a second detector configured to detect intensity of light of a second wavelength band different from the first wavelength band,
a first sensitivity of the first detector to the light of the first wavelength band is lower than a second sensitivity of the second detector to the light of the second wavelength band,
a first light receiving area of the first detector is larger in size than a second light receiving area of the second detector,
sizes of the first light receiving area and the second light receiving area are adjusted to correct a variation in sensitivities of the first and second detectors and to compensate for the first sensitivity being lower than the second sensitivity, and
a size of the first light receiving area of the first detector is set in accordance with an emission intensity of the light radiated by the detection target, and a distance between the light detection sensor and the detection object.

2. The light detection sensor according to claim 1, wherein
the plurality of detectors further comprises a third detector configured to detect intensity of light of a third wavelength band different from the first wavelength band and the second wavelength band,
the first sensitivity of the first detector to the light of the first wavelength band is lower than a third sensitivity of the third detector to light of the third wavelength band,
the first light receiving area of the first detector is larger than a third light receiving area of the third detector, and
the size of the first light receiving area of the first detector is set in accordance with at least one of sensitivities of the second and third detectors, the emission intensity of the light radiated by the detection target, and the distance between the light detection sensor and the detection object.

3. The light detection sensor according to claim 2, wherein
the second sensitivity of the second detector to the light of the second wavelength band is lower than the third sensitivity of the third detector to the light of the third wavelength band, and
the second light receiving area of the second detector is larger than the third light receiving area of the third detector.

4. The light detection sensor according to claim 1, wherein a length of a path in which the light of the first wavelength band reaches the first detector from the detection object is shorter than a length of a path in which the light of the second wavelength band reaches the second detector from the detection object.

5. A light detection device, comprising:
the light detection sensor according to claim 1; and
processing circuitry configured to control the light detection sensor, wherein
the processing circuitry detects at least the intensity of the light of the first wavelength band and the intensity of the light of the second wavelength band during an off-state of the light source after the light is radiated from the light source to the detection object.

6. The light detection device according to claim 5, wherein the processing circuitry detects at least the intensity of the light of the first wavelength band and the intensity of the light of the second wavelength band multiple times during the off-state of the light source after the light is radiated from the light source to the detection object.

7. A sheet processing apparatus, comprising:
the light detection device according to claim 5, wherein
the processing circuitry performs a sheet recognition processing based on at least the intensity of the light of the first wavelength band and the intensity of the light of the second wavelength band detected during the off-state of the light source.

* * * * *